S. P. BUSH.
CAR TRUCK.
APPLICATION FILED DEC. 8, 1910.
1,014,807.
Patented Jan. 16, 1912.
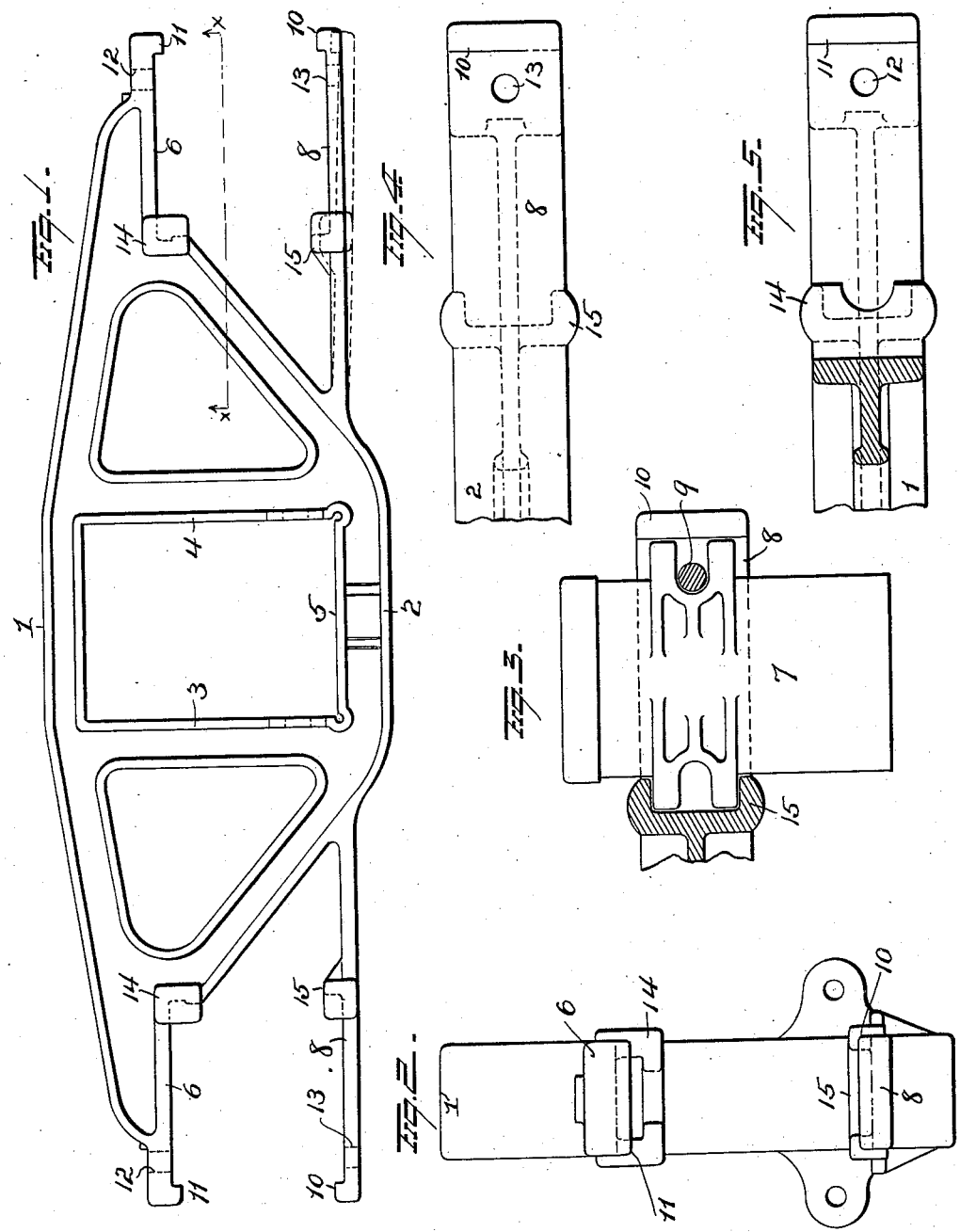

UNITED STATES PATENT OFFICE.

SAMUEL P. BUSH, OF COLUMBUS, OHIO, ASSIGNOR TO THE BUCKEYE STEEL CASTINGS COMPANY, OF COLUMBUS, OHIO.

CAR-TRUCK.

1,014,807.

Specification of Letters Patent. Patented Jan. 16, 1912.

Application filed December 8, 1910. Serial No. 596,305.

*To all whom it may concern:*

Be it known that I, SAMUEL P. BUSH, of Columbus, in the county of Franklin and State of Ohio, have invented certain new and useful Improvements in Car-Trucks; and I do hereby declare the following to be a full, clear, and exact description of the invention, such as will enable others skilled in the art to which it appertains to make and use the same.

This invention relates to an improvement in car trucks the object being to provide an integral cast steel truck frame with journal boxes that are removable, and which are secured in position in the frame for application to the journals of the axle in a very simple and effective manner, and it consists in the details of construction as will be more fully described and pointed out in the claims.

In the accompanying drawings, Figure 1 is a view in side elevation of the side frame of a car truck embodying my invention. Fig. 2 is a view in end elevation. Fig. 3 is a view in section showing the journal box in place. Fig. 4 is a view in bottom plan of one end of the frame and Fig. 5 is a section on line $x$—$x$ of Fig. 1.

It is well known that for many years it has been desirable to have a car truck frame with a journal box that is removable and renewable in case of wear or accident, and in recent years it has been found highly desirable to have the truck frame made as simple, as strong, as light and with as few pieces as possible so as to avoid the danger of loose connections, loose nuts, etc., and to preserve the integrity of the construction, and to save much of the inspection which, for safety purposes with built-up trucks consisting of many pieces, has to be made with great frequency.

The truck frame is preferably an integral steel structure resembling a truss, of which 1 is the upper or compression member and 2 is the lower or tension member, the two members meeting each other at either end, and being connected near the center by the two members 3 and 4, which are generally designated as column guides. Between the upper and lower members and between these column guides is an opening adapted to receive the car bolster, which may be supported by springs resting on a spring seat 5, or it may be otherwise supported. Beyond the junction of members 1 and 2 at each end of the frame, is the upper member 6 of the jaw, which member extends over and rests on top of the journal box 7 when the latter is in its position. It is the function of each jaw member 6, therefore, to carry one-fourth of the total load coming on the truck. From the lower member 2, there is extended at each end of the frame, from the center, a member or jaw 8, which is shown integral and which may be designated as a tie-bar, the object of this being to supply a bottom connection to the journal boxes so as to assist in holding them securely against possible movement from application of the brakes or from shocks that a car may receive in service.

My invention resides principally in means for securing the journal box 7 in its position in the jaws 6 and 8 of the frame and for preventing it from moving outwardly away from the jaws in the event of any force so tending, and at the same time to relieve the journal box bolt 9 or bolts from the stresses that might be imposed upon it ordinarily by the application of such a force; the function of the bolt 9 being principally to draw the upper and lower jaws 6 and 8 together against the upper and lower surfaces of the journal box, and secondarily to assist the means provided in the construction in preventing the journal box from moving outwardly from the jaw. My purpose is to provide this latter means as integral with the truck frame, thereby avoiding the introduction of additional parts. To this end I provide either the lower jaw 8, with an upwardly projecting lug 10, or the upper jaw member 6 at its outer end, with a downwardly projecting lug 11, or I may use both at the same time.

The space between the upper jaw 6 and the lower jaw 8 is designed to receive the journal box, and when properly assembled, fits neatly between the inner surfaces of the jaws 6 and 8, but obviously with either the lug 10 or 11, in position as shown, the journal box could not be entered between the jaws unless sufficient room were provided between the said lugs to permit it to pass into position. To make this possible, therefore, the tie bar or lower jaw 8 is sufficiently long, and is attached to the member 2 at such a point that it is possible to cast the frame with the member 8 inclined slightly downward, as shown by the dotted lines, or it may be cast straight as shown in full lines and sprung down as shown in dotted lines. If the former method is employed the journal box bolt 9, which is introduced through the holes 12 and 13, is used with its nuts on one end to draw the lower member up to fit neatly against the lower side of the journal box after the latter has been put in position. With this arrangement the lugs 10 and 11 overlap the outer side of the journal box at convenient points, and serve to lock the journal box in its proper position against any outward movement. The inner side of the journal box, adjacent the upper jaw 6 and the lower jaw 8, is made to rest against abutments 14 and 15 integral with the jaws 6 and 8 which abutments restrain its movement in the opposite direction. The lower jaw 8 is cast of a thickness and other dimensions such that this springing action can be readily effected, and as previously stated I may use but one lug 11 on the upper member 6, or I may use one lug 10 on the lower member 8, or I may use both at the same time.

Having fully described my invention what I claim as new and desire to secure by Letters-Patent, is:—

1. A truck frame consisting of compression and tension members and two jaws at each end, all cast integral, the lower jaws each being provided with an upwardly projecting lug, and adapted to yield or give vertically, whereby each journal box may be entered side-wise between its jaws and over the lug and when in place be held against lateral displacement by the lug on the yielding lower jaw.

2. A truck frame consisting in part of compression and tension members, and jaws projecting at each end from said frame, all of said parts being cast integral, the lower jaws being slightly inclined downwardly at their free ends.

3. A truck frame consisting in part of compression and tension members, and jaws projecting at each end from said frame, all of said parts being cast integral, the lower jaws being elastic and slightly inclined downwardly at their free ends and each provided with an upwardly projecting lug at its free end.

4. A truck frame consisting of compression and tension members and the jaws 6 and 8, the latter having upwardly projecting lugs, all cast integral, the jaws 8 being of greater length than the jaws 6 and adapted to yield or give vertically whereby each journal box may be entered side-wise between the jaws and over the lug, and when in place be held against displacement by the lug on the yielding lower jaw.

In testimony whereof, I have signed this specification in the presence of two subscribing witnesses.

SAMUEL P. BUSH.

Witnesses:
GEO. G. WERRING,
W. E. PAGE.

Copies of this patent may be obtained for five cents each, by addressing the "Commissioner of Patents, Washington, D. C."